DIGITAL FILTERS

Filed Feb. 29, 1968

PRIOR ART $n^{th}$ ORDER DIGITAL FILTER WITH $N=8$

MODIFIED $n^{th}$ ORDER FILTER WITH $n=8$

INVENTORS
L. B. JACKSON
H. S. McDONALD
BY H. L. Logan
ATTORNEY 3,522,546

DIGITAL FILTERS

Leland B. Jackson, North Plainfield, and Henry S. McDonald, Murray Hill, N.J., assignors to Bell Telephone Laboratories, Incorporated, Murray Hill, N.J., a corporation of New York Filed Feb. 29, 1968, Ser. No. 709,423
Int. Cl. H03k 5/00
U.S. Cl. 328—167 6 Claims

ABSTRACT OF THE DISCLOSURE

Digital filters are disclosed in which multiplier circuits are repetitively used on each encoded input sample with the multipliers of the circuits being changed with each use. In one filter, each encoded input sample is applied for a complete series of these changes with the various outputs thus produced being summed to produce a filtered output. In another filter, a feedback path is used so that each encoded input sample is recirculated until all of the changes in multipliers have occurred.

BACKGROUND OF THE INVENTION

Field of the invention

This invention relates to digital filters.

Description of the prior art

Digital filtering comprises operating on the numerical values of a sampled and encoded input signal to produce numerical values which may be decoded to produce a filtered version of the input signal.

Digital filters have a number of advantages over analog filters. Greater accuracy, for example, may be realized. Furthermore, a greater variety of filters may be constructed, including relatively small and economical low frequency filters. Still further, such filtering uses digital circuitry which has several advantages over analog filtering circuitry. Firstly, digital circuitry has a greater tolerance to drifting of component values. Secondly, digital circuitry does not require inductors, which is a decided advantage when using printed and integrated circuitry.

Prior art digital filters and their theory of operation are described, for example, in: (1) "Some Practical Considerations in the Realization of Linear Digital Filters," by J. F. Kaiser, in the Proceedings of the Third Annual Allerton Conference on Circuit and System Theory (1965); (2) "Digital Filters" by J. F. Kaiser, in System Analysis by Digital Computer, edited by F. F. Kuo and J. F. Kaiser (J. Wiley & Sons, 1966) and; (3) "Digital Filters Design Techniques in the Frequency Domain," by C. M. Rader and B. Gold in the February 1967 Proceedings of the IEEE. Further references are cited in bibliographies included in these references.

A study of the above-cited references discloses that prior art digital filters use pluralities of multiplier circuits. Although the number of such circuits may not be objectionable when constructing and using only one or two filters, the number does become objectionable when larger quantities of digital filters are required, for example, for multiplexing purposes in telephone service. Digital filters employing fewer multiplier circuits are therefore desirable.

SUMMARY OF THE INVENTION

An object of the invention is to reduce the number of multiplier circuits required in digital filters.

This and other objects are achieved in accordance with the invention by repetitively using a modified $n$th order filter on each digital input with the multiplier constants of the filter multiplier circuits being changed with each use. In one embodiment of the invention each digital input is applied to the modified filter for a complete series of these changes with the various filter outputs thus produced being summed to produce the desired modified digital output. In another embodiment, a feedback path is used so that each digital input is recirculated through the filter until all the multiplier changes have occurred, at which time the filter output comprises the desired modified digital output.

A specific feature of the invention, therefore, is the repetitive use of a modified digital filter with the multiplier constants of the filter multiplier circuits being changed each time it is used.

Other objects and features of the invention will become apparent from a study of the following detailed description of several specific embodiments.

BRIEF DESECRIPTION OF THE DRAWINGS

DESCRIPTION OF THE DISCLOSED EMBODIMENTS

Figure 1:
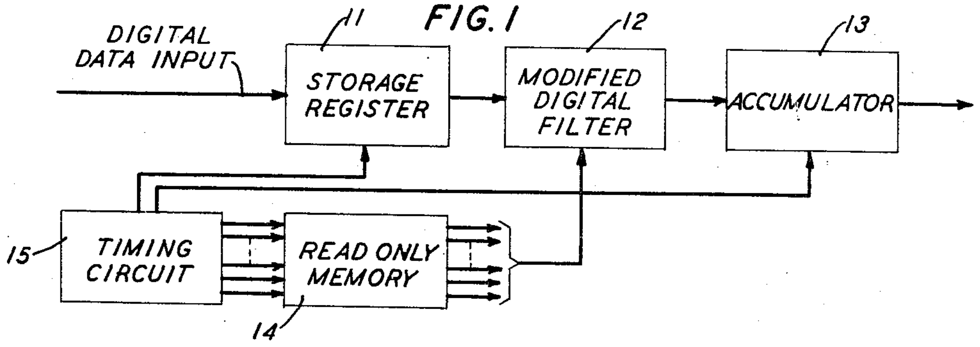
FIGS. 1 and 4 are block diagrams showing several embodiments of the invention.

One embodiment of the invention is illustrated in FIG. 1. Each digital input is temporarily stored in a storage register 11. While stored in register 11, this input is applied to a modified filter 12 whose outputs in turn are accumulated in an accumulator 13.

As will be explained in greater detail later, filter 12 includes a plurality of multiplier circuits. Sets of multiplier constants for these circuits are supplied in a sequential manner by a read only memory 14 which is timed by a timing circuit 15. Timing circuit 15 also times register 11 and accumulator 13. When operating, register 11 is timed so that each digital input is applied to filter 12 until all of the sets of multiplier constants have been read out of memory 14, and accumulator 13 is timed so that each of its outputs comprises the accumulation of a particular number of outputs from filter 12.

As appreciated by those skilled in the art, the embodiment may be designed so that the digits in each digital input and in each of the outputs may appear in either parallel or serial form. With the exception of modified digital filter 12, all of these elements are conventional arrangements found in the prior art.

To gain an understanding of modified filter 12 and of the operation and advantages of the invention, the following discussion first considers a typical $n$th order digital filter where $n=8$. Following that consideration is a consideration of a modified version of this typical filter which, when used in FIG. 1, results in a system function identical to that of the typical filter. A comparison of these modified and unmodified filters immediately demonstrates the reduction in multiplier circuits. Furthermore, this discussion will enable those skilled in the art to readily modify other prior art digital filters for use in practicing the invention.

Figure 2:
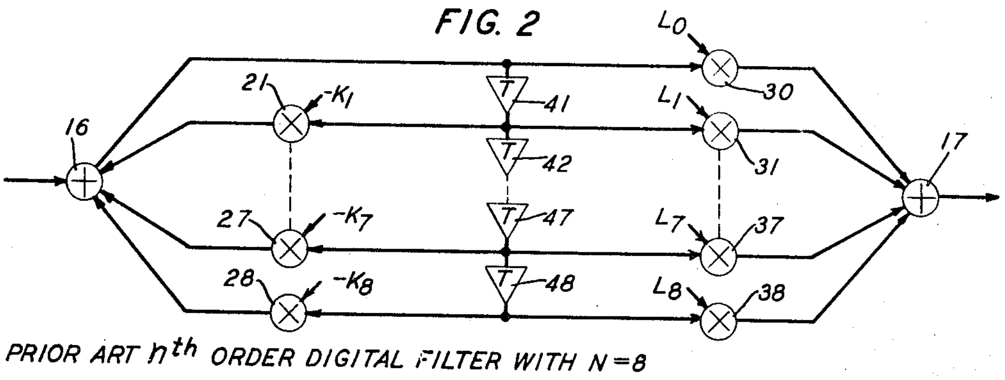
FIG. 2 is an eighth order digital filter.

FIG. 2 shows an eighth order digital filter having the configuration shown in FIG. 7.16$a$ of the previously identified article "Digital Filters" by J. F. Kaiser and in FIG. 4 of the previously identified article appearing in the Proceedings of the IEEE. Although the symbols of the Kaiser article could have been used in this application, the IEEE article symbols were used because this publication can be more readily obtained by interested persons.

The filter of FIG. 2 comprises input and output adder circuits 16 an 17, multiplier circuits 21 through 28 and 30 through 38, and delay circuits 41 through 48. All of these circuits—some of which are implied by the dashes—are, of course, digital circuits. Furthermore, the delay circuits frequently comprise storage registers that are strobed by a timing source to thereby produce synchronized delayed outputs at time intervals equal to T.

Adder 16 receives input digital data and outputs from multiplier circuits 21 through 28 whereas adder 17 receives outputs from multiplier circuits 30 through 38. The output from adder 16 is applied to multiplier circuit 30 and also to the serially connected delay circuits 41 through 48. Inputs to multipliers 21 through 28 and 31 through 38 comprise outputs from the delay circuits. Multipliers 21 through 28 and 30 through 38 also receive multiplier constants $-K_1$ through $-K_8$ and $L_0$ through $L_8$, respectively.

As shown by Equation 8 of the IEEE article, an $n$th order digital filter has a transfer characteristic described by the system function:

$$H(z)=\frac{\sum_{i=0}^{r} L_i z^{-i}}{1+\sum_{i=1}^{m} K_i z^{-i}}$$

where:

$r$=number of previous successive inputs used to compute each output, $m$=number of previous successive outputs used to compute each output, $L_i$ and $K_i$=multiplier constants to perform a given filtering requirement, $z^{-i}$=the $z$ transform operator corresponding to a delay of $i$ sampling periods of the input to the filter, and $n$=the maximum of the integers $r$ and $m$.

In FIG. 2, $r=m=n=8$.

In accordance with the invention an $n$th order filter is produced by using a modified $n$th order filter in FIG. 1. This modified filter must have a transfer characteristic described by the system function:

$$H'(z)=\frac{\sum_{i=0}^{p} l_i z^{-i}}{1+\sum_{i=1}^{q} k_i z^{-i}}$$

where:

$l_i$ and $k_i$=multiplier constants applied to the multiplier circuits in the modified filter to perform a given filtering requirement, where said constants occur in $u$ sets with each set comprising unique values for $l_0$ through $l_p$ and $k_1$ through $k_q$, $p$=an integer equal to $r/u$, and $q$=an integer equal to $m/u$.

Figure 3:
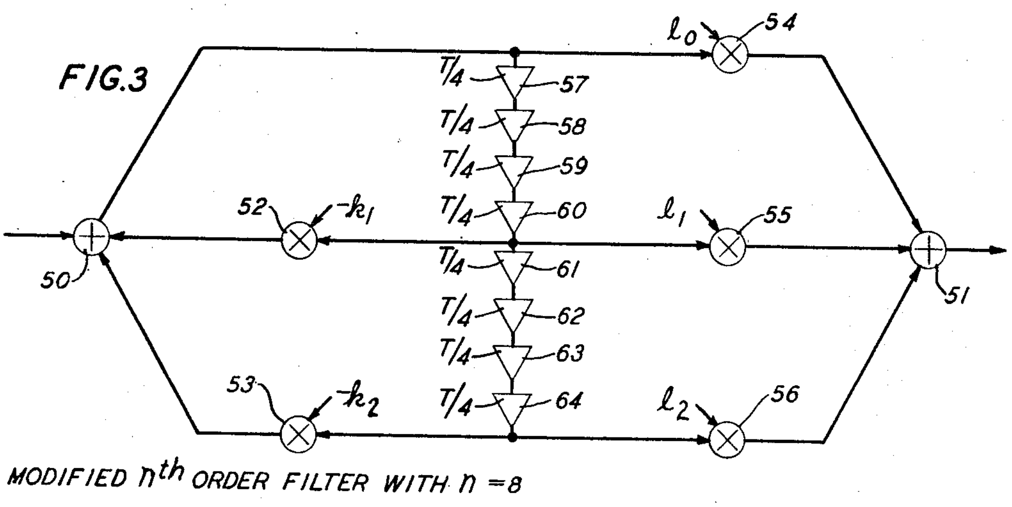
FIG. 3 is a modified version of the filter of FIG. 2 as used when practicing the present invention.

FIG. 3 shows the filter of FIG. 2 modified to meet the latter function. This modified filter includes input and output adder circuits 50 and 51, multiplier circuits 52 through 56 and eight serially connected delay circuits 57 through 64. In this modified filter, $u=4$ so that $p=q=2$. For each input to storage register 11, read only memory 14 of FIG. 1 must therefore provide, in sequence, four sets of multiplier constants, namely:

(1) $-k_{11}$, $-k_{21}$, $l_{01}$, $l_{11}$, $l_{21}$;
(2) $-k_{12}$, $-k_{22}$, $l_{02}$, $l_{12}$, $l_{22}$;
(3) $-k_{13}$, $-k_{23}$, $l_{03}$, $l_{13}$, $l_{23}$; and
(4) $-k_{14}$, $-k_{24}$, $l_{04}$, $l_{14}$, $l_{24}$.

Furthermore, as $u=4$, four sets of data must be stored between the input to multiplier circuit 54 and the inputs to multiplier circuits 52, 55 and four sets of data must be stored between the inputs to multiplier circuits 52, 55 and the inputs to multiplier circuits 53, 56. One way to accomplish this is to use a register strobed at $T/4$ intervals for each of delay circuits 57 through 64.

When the modified filter of FIG. 3 is used in the embodiment of FIG. 1, FIG. 1 has the characteristic of an eighth order digital filter; that is, its characteristic is the same as that of the filter shown in FIG. 2.

Referring to FIG. 3 in a more general sense, there are $u$ sets of multiplier constants and $u$ delay circuits in each group of delay circuits with each circuit providing a delay of $T/u$. Furthermore, whereas the filter of FIG. 2 requires $(2n+1)$ multiplier circuits, the modified filter requires $$\left(\frac{2n}{u}+1\right)$$

multiplier circuits which is $$2n\left(1-\frac{l}{u}\right)$$

less multiplier circuits. In the present example, twelve multiplier circuits are eliminated. This saving in multiplier circuits is of particular interest in multichannel service where read only memory 14 and timing circuit 15 are shared by filters in respective channels.

Before discussing the other disclosed embodiment of the invention, several other features of the invention should be noted. First, the invention is not limited to an even order filter function. A seventh order filter may be produced, for example, by permitting appropriate multiplier constants in the above identified sets to equal zero. Secondly, the modified filter is not limited to that shown but may be derived from any known $n$th order filter and, furthermore, may comprise a modified version of an embodiment of the present invention.

Figure 4:
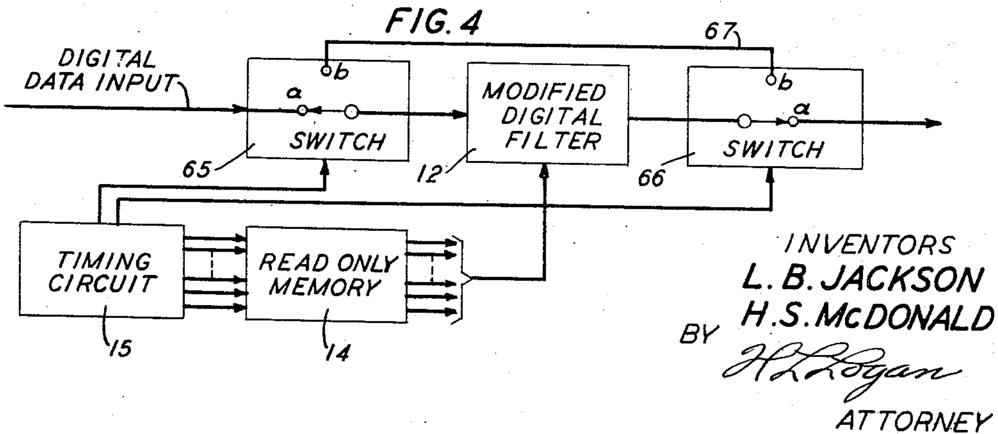

The embodiment disclosed in FIG. 4 is similar to that of FIG. 1. The difference between these embodiments is the replacement of storage register 11 and accumulator 13 with switches 65 and 66, respectively, and a feedback path 67 connected between the switches. When switch 65 is in an $a$ position, the digital data input is coupled into modified filter 12. On the other hand, when switch 66 is in a $b$ position, data on feedback path 67 is coupled into modified filter 12. Similarly, when switch 66 is in an $a$ position, the output of modified filter 12 is the output of the embodiment whereas in a $b$ position, the output of modified filter 12 is coupled to feedback path 67.

When operating, the embodiment of FIG. 4 receives a digital input as a result of switch 65 being in its $a$ position. Switches 65 and 66 then switch to their $b$ positions so that a predetermined number of outputs from filter 12 are recirculated through filter 12 by way of feedback path 67. The multiplier constants are changed each time data passes through modified filter 12. Switches 65 and 66 then switch back to their $a$ positions so that a new digital input can be received by filter 12 while the filter output is produced as the embodiment output. In some arrangements, these switches may switch simultaneously while in others one will precede the other.

This embodiment of the invention uses $n$th order digital filters modified as described above with respect to the embodiment of FIG. 1. Furthermore, all of the other above remarks apply equally well to the present embodiment. As appreciated by those skilled in the art, it should be noted that the choice of embodiment of the invention is a factor in determining the multiplier constants.

While two embodiments of the invention have been disclosed and described, it is to be understood that various other embodiments may be devised by those skilled in the art without departing from the spirit and scope of the invention.

What is claimed is:

1. An $n$th order digital filter comprising:
a modified digital filter which is used $u$ times on each input to the $n$th order digital filter, said modified digital filter having a transfer characteristic described by the system function $$H'(z)=\frac{\sum_{i=0}^{p} l_i z^{-i}}{1+\sum_{i=1}^{q} k_i z^{-i}}$$

where:

$p$=an integer equal to the number of previous successive, $n$th order filter inputs used to compute each $n$th order filter output divided by $u$, $p$=an integer equal to the number of previous successive $n$th order filter outputs used to compute each $n$th order filter output divided by $u$, $l_i$ and $k_i$=multiplier constants applied to the multiplier circuits in the modified filter to perform a given filtering requirement, where said constants occur in $u$ sets with each set comprising unique values for $l_0$ through $l_p$ and $k_1$ through $k_q$, $z^{-i}$=the $z$ transform operator corresponding to a delay of $i$ sampling periods of the input to the filter, and $n$=the maximum of the previous successive inputs or the previous successive outputs used to produce each output of the $n$th order filter, and means connected to said modified filter to apply a set of multiplier constants to its multiplier circuits each time the modified filter is used on an input so that said sets are used for the $u$ operations, respectively, on each input to said $n$th order filter.

2. An $n$th order digital filter comprising:

input and output terminals, an $n$th order digital filter modified to have a transfer characteristic described by the system function $$H'(z)=\frac{\sum_{i=0}^{p} l_i z^{-i}}{1+\sum_{i=1}^{q} k_i z^{-i}}$$

where:

$p$=an integer equal to the number of previous successive, $n$th order filter inputs used to compute each $n$th order filter output divided by $u$, $q$=an integer equal to the number of previous successive $n$th order filter outputs used to compute each $n$th order filter output divided by $u$, $l_i$ and $k_i$=multiplier constants applied to the multiplier circuits in the modified filter to perform a given filtering requirement, where said constants occur in $u$ sets with each set comprising unique values for $l_0$ through $l_p$ and $k_1$ through $k_q$, $z^{-i}$=the $z$ transform operator corresponding to a delay of $i$ sampling periods of the input to the filter, and $n$=the maximum of the previous successive inputs or the previous successive outputs used to produce each output of the $n$th order filter, first means connected to said modified filter to apply sequentially said sets of multiplier constants to its multiplier circuits so that all of said sets of constants are applied for each input to said $n$th order filter, second means connected between said input terminals said modified filter and, furthermore, to said first means to receive each input to said input terminals and to apply each of said inputs to said modified filter $u$ times and in synchronism with said sets of constants, and third means connected between said modified filter said said output terminals and, furthermore, to said first means to produce a sum of the $u$ outputs from said modified filter in response to each input to said input terminals and to apply said sums to said output terminals.

3. An $n$th order digital filter comprising:

first input and output terminals, an $n$th order digital filter modified to have a transfer characteristic described by the system function $$H'(z)=\frac{\sum_{i=0}^{p} l_i z^{-i}}{1+\sum_{i=1}^{q} k_i z^{-i}}$$

where:

$p$=an integer equal to the number of previous successive $n$th order filter inputs used to compute each $n$th order filter output divided by $u$, $q$=an integer equal to the number of previous successive $n$th order filter outputs used to compute each $n$th order filter output divided by $u$, $l_i$ and $k_i$=multiplier constants applied to the multiplier circuits in the modified filter to perform a filtering requirement, where said constants occur in $u$ sets with each set comprising unique values for $l_0$ through $l_p$ and $k_1$ through $k_q$, $z^{-i}$=the $z$ transform operator corresponding to a delay of $i$ sampling periods of the input to the filter, and $n$=the maximum of the previous successive inputs or the previous successive outputs used to produce each output of the $n$th order filter, first means connected to said modified filter to apply sequentially said sets of multiplier constants to its multiplier circuits so that all of said sets of constants are applied for each input to said $n$th order filter, a feedback path having input and output terminals, and second means responsive to said first means to connect said modified filter to said first input terminals to receive each input received by said first terminal, to then connect said modified filter between said feedback path input and output terminals to recirculate ($u$–$l$) outputs from said modified filter and to then connect said filter to said first output terminals.

4. An $n$th order digital filter having a transfer characteristic described by the system function $$H(z)=\frac{\sum_{i=0}^{r} L_i z^{-i}}{1+\sum_{i=1}^{m} K_i z^{-i}}$$

where:

$r$=number of previous successive inputs used to compute each output, $m$=number of previous successive outputs used to compute each output, $L_i$ and $K_i$=multiplier constants to perform a given filtering requirement, $z^{-i}$=the $z$ transformer operator corresponding to a delay of $i$ sampling periods of the input to the filter, and $n$=the maximum of the integers $r$ and $m$, said $n$th order filter comprising a modified digital filter which is used $u$ times on each input to the $n$th order digital filter, said modified digital filter having a transfer characteristic described by the system function $$H'(z)=\frac{\sum_{i=0}^{p} l_i z^{-i}}{1+\sum_{i=1}^{q} k_i z^{-i}}$$

where:

$p$=an integer equal to $r/u$, $q$=an integer equal to $m/u$, and $l_i$ and $k_i$=multiplier constants applied to the multiplier circuits in the modified filter to perform a given filtering requirement, where said constants occur in $u$ sets with each set comprising unique values for $l_0$ through $l_p$ and $k_1$ through $k_q$, and means connected to said modified filter to apply a set of multiplier constants to its multiplier circuits each time the modified filter is used on an input so that said sets are used for the $u$ operations, respectively, on each input to said $n$th order filter.

5. An $n$th order digital filter having a transfer characteristic described by the system function $$H(z)=\frac{\sum_{i=0}^{r} L_i z^{-i}}{1+\sum_{i=1}^{m} K_i z^{-i}}$$

where:

$r$=number of previous successive inputs used to compute each output, $m$=number of previous successive outputs used to compute each output, $L_i$ and $K_i$=multiplier constants to perform a given filtering requirement, $z^{-i}$=the $z$ transformer operator corresponding to a delay of $i$ sampling periods of the input to the filter, and $n$=the maximum of the integers $r$ and $m$, and, furthermore, including a modified digital filter which is used $u$ times on each input to the $n$th order digital filter, said $n$th order filter comprising input and output terminals, an $n$th order digital filter modified to have a transfer characteristic described by the system function $$H'(z)=\frac{\sum_{i=0}^{p} l_i z^{-i}}{1+\sum_{i=1}^{q} k_i z^{-i}}$$

where:

$p$=an integer equal to $r/u$, $q$=an integer equal to $m/u$, and $l_i$ and $k_i$=multiplier constants applied to the multiplier circuits in the modified filter to perform a given filtering requirement, where said constants occur in $u$ sets with each set comprising unique values for $l_0$ through $l_p$ and $k_1$ through $k_q$, first means connected to said modified filter to apply sequentially said sets of multiplier constants to its multiplier circuits so that all of said sets of constants are applied for each input to said $n$th order filter, second means connected between said input termnials and said modified filter and, furthermore, to said first means to receive each input to said input terminals and to apply each of said inputs to said modified filter $u$ times and in synchronism with said sets of constants, and third means connected between said modified filter and said output terminals and, furthermore, to said first means to produce a sum of the $u$ outputs from said modified filter in response to each input to said input terminals and to apply said sums to said output terminals.

6. An $n$th order digital filter having a transfer characteristic described by the system function $$H(z)=\frac{\sum_{i=0}^{r} L_i z^{-i}}{1+\sum_{i=1}^{m} K_i z^{-i}}$$

where:

$r$=number of previous successive inputs used to compute each output, $m$=number of previous successive outputs used to compute each output, $L_i$ and $K_i$=multiplier constants to perform a given filtering requirement, $z^{-i}$=the $z$ transform operator corresponding to a delay of $i$ sampling periods of the input to the filter, and $n$=the maximum of the integers $r$ and $m$, and furthermore, including a modified digital filter which is used $u$ times on each input to the $n$th order digital filter, said $n$th order filter comprising, first input and output terminals, an $n$th order digital filter modified to have a transfer characteristic described by the system function $$H'(z)=\frac{\sum_{i=0}^{p} l_i z^{-i}}{1+\sum_{i=1}^{q} k_i z^{-i}}$$

where:

$p$=an integer equal to $r/u$, $q$=an integer equal to $m/u$, and $l_i$ and $k_i$=multiplier constants applied to the multiplier circuits in the modified filter to perform a given filtering requirement, where said constants occur in $u$ sets with each set comprising unique values for $l_0$ through $l_p$ and $k_1$ through $k_q$, first means connected to said modified filter to apply sequentially said sets of multiplier constants to its multiplier circuits so that all of said sets of constants are applied for each input to said $n$th order filter, a feedback path having input and output terminals, and second means responsive to said first means to connect said modified filter to said first input terminals to receive each input received by said first terminal, to then connect said modified filter between said feedback path input and output terminals to recirculate ($u$–$l$) outputs from said modified filter and to then connect said filter to said first output terminals.

References Cited

UNITED STATES PATENTS

| | | | |
|---|---|---|---|
| 3,133,254 | 5/1964 | Lindsey et al. | 328—165 X |
| 3,237,111 | 2/1966 | Coates et al. | 328—165 X |
| 3,314,015 | 4/1967 | Simone | 328—165 |
| 3,421,141 | 1/1969 | Meyerhoff | 328—167 X |

JOHN S. HEYMAN, Primary Examiner

U.S. Cl. X.R.

328—143, 159